United States Patent [19]

Hortvet et al.

[11] 3,937,054
[45] Feb. 10, 1976

[54] HEAVY DUTY PIPE SPREADER
[75] Inventors: Douglas R. Hortvet; Norman C. Bennett, both of Houston, Tex.
[73] Assignee: Armco Steel Corporation, Middletown, Ohio
[22] Filed: Sept. 10, 1974
[21] Appl. No.: 504,737

[52] U.S. Cl. .................. 72/393; 72/370; 72/398; 72/466
[51] Int. Cl.² .......................................... B21D 41/02
[58] Field of Search ............ 72/392, 393, 398, 465, 72/466, 367, 368, 369, 370; 228/5, 17, 47, 50; 219/59, 8.5, 60, 67; 29/200 P, 200 J, 493, 475; 269/48.1

[56] References Cited
UNITED STATES PATENTS

| | | | |
|---|---|---|---|
| 2,007,996 | 7/1935 | Baker | 228/15 |
| 2,734,120 | 2/1956 | Sensenig | 269/48.1 |
| 2,845,989 | 8/1958 | Ewaldson et al. | 228/10 |
| 3,285,490 | 11/1966 | Roper | 228/15 |
| 3,362,603 | 1/1968 | Bauer et al. | 228/5 |
| 3,397,564 | 8/1968 | Schroeder | 72/393 |
| 3,462,059 | 8/1969 | Bauer et al. | 228/5 |
| 3,633,813 | 12/1971 | Looney | 228/44 |
| 3,647,131 | 3/1972 | Hahne | 228/5 |
| 3,765,665 | 10/1973 | Ijork | 29/468 |
| 3,770,927 | 11/1973 | Christopher | 269/48.1 |

Primary Examiner—C. W. Lanham
Assistant Examiner—James R. Duzan
Attorney, Agent, or Firm—Melville, Strasser, Foster & Hoffman

[57] ABSTRACT

A heavy duty pipe spreader to open formed steel-line pipe, approximately 40 feet long, of approximately 0.250 to 0.750 wall thickness, so as to obtain an approximate 2 inch permanent edge separation prior to O.D. sub-arc welding. The pipe spreader is comprised of an approximately 45 feet long boom, pivotally supported at one end by a vertically adjustable base support and intermediate its length by four hydraulically actuated devices under the boom and mounted to the floor; these devices retract as the pipe telescopes onto the boom. A device at the extreme front of the unit centers and assists in stabilizing the pipe and unit during spreading. The pipe is received on five support rollers, the first of which drives the other four, and all of which are fixed in place and rotate only to move pipe over the vertically adjustable boom. Attached to the boom structure are five sets of pivoted arms which are operated by wedge devices attached to a center pull rod. A large hydraulic cylinder assembled at the base support end of the machine applies the load requirements to the pull rod for actuation of the pivoted spreader arms. A roller is pivotally mounted on each end of each spreader arm so as to eliminate excessive friction and marking during spreading of the pipe.

14 Claims, 10 Drawing Figures

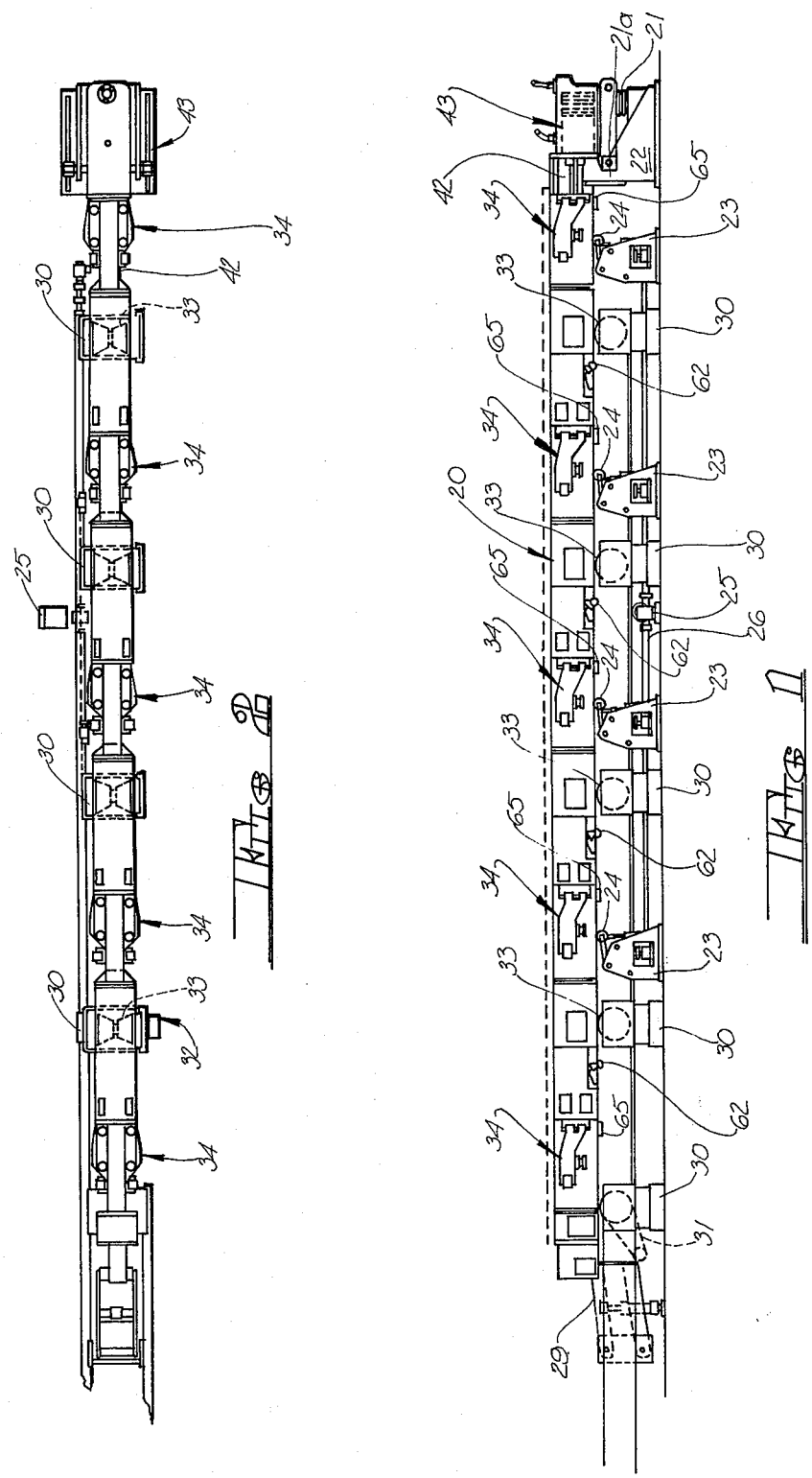

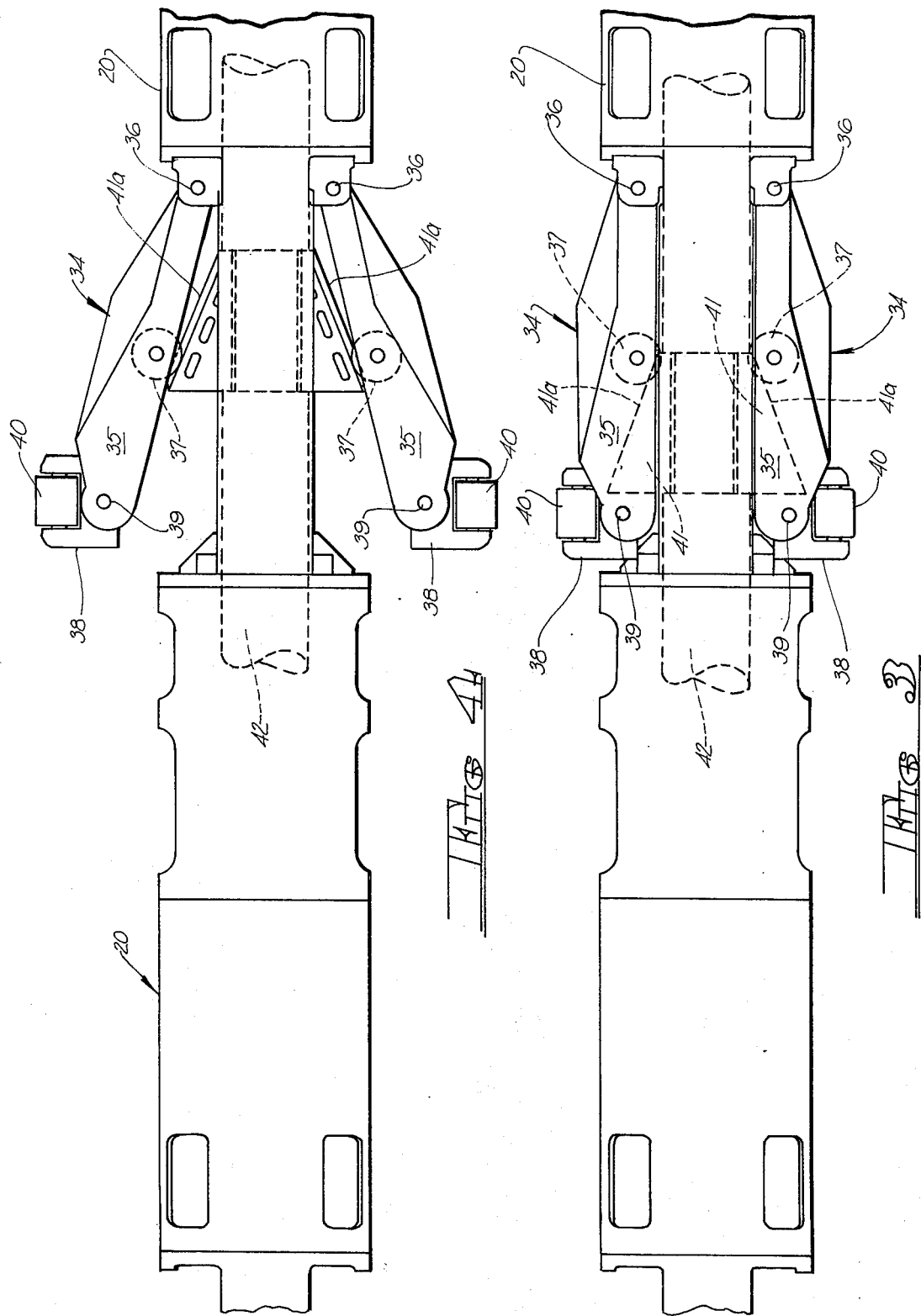

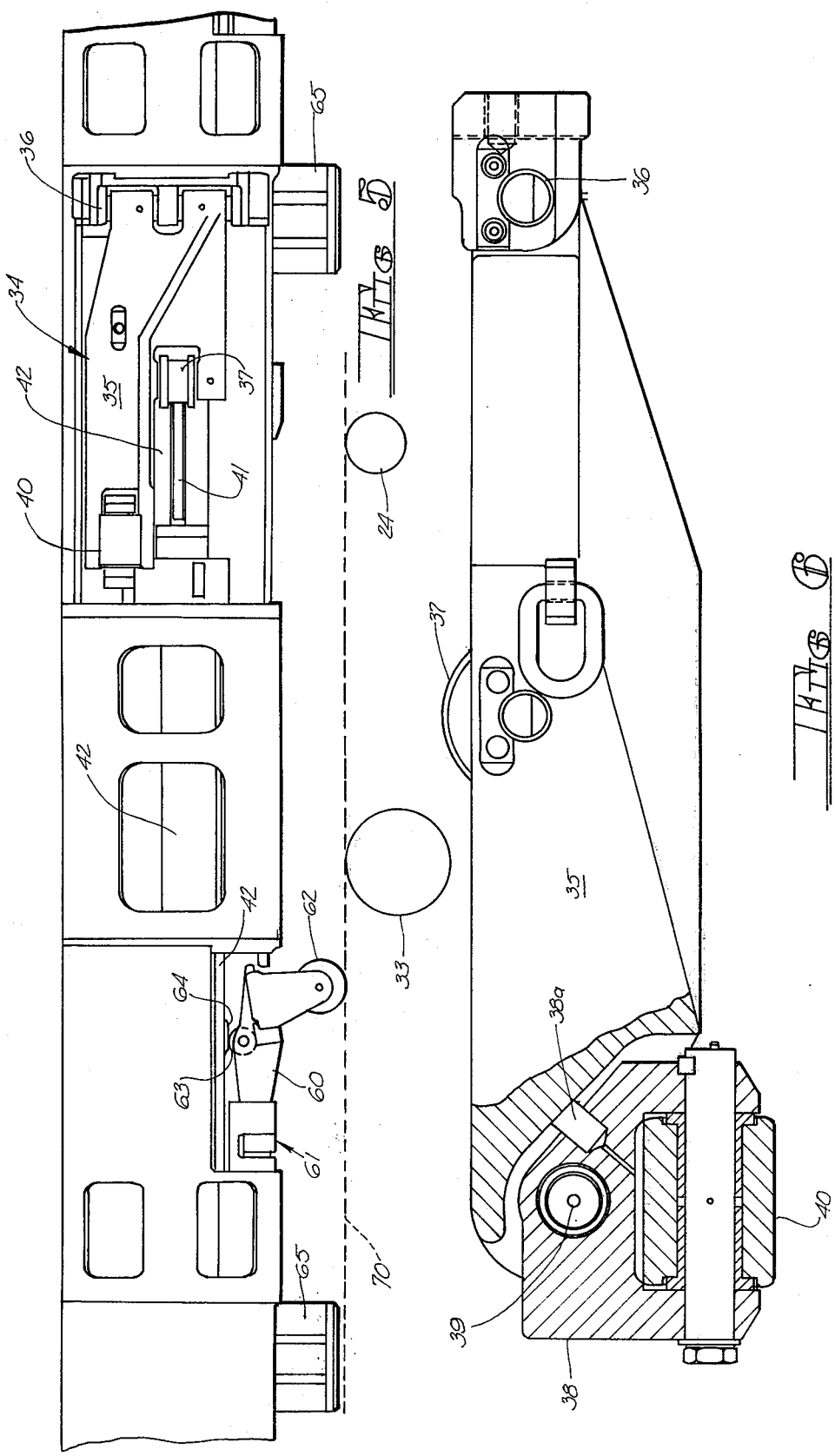

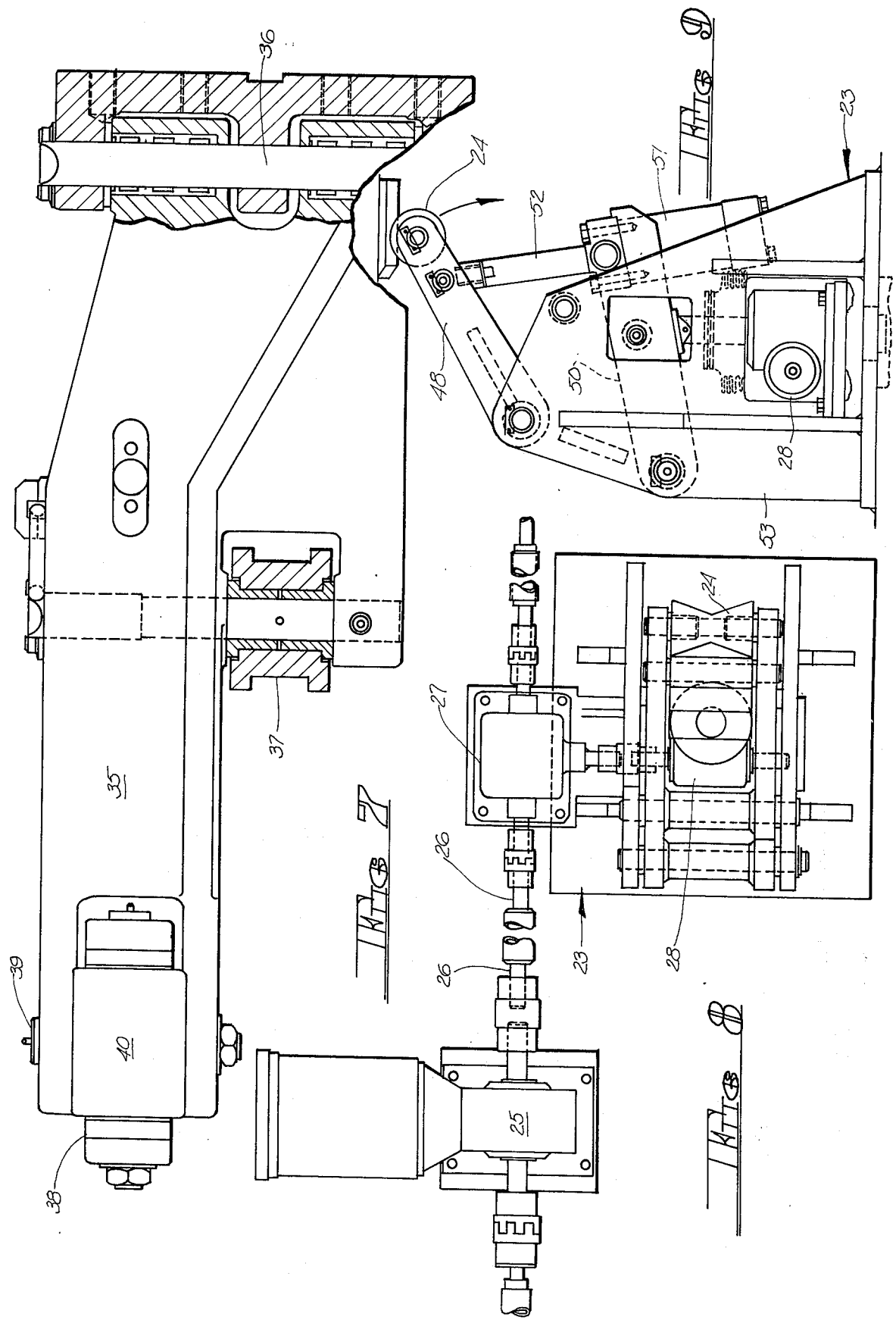

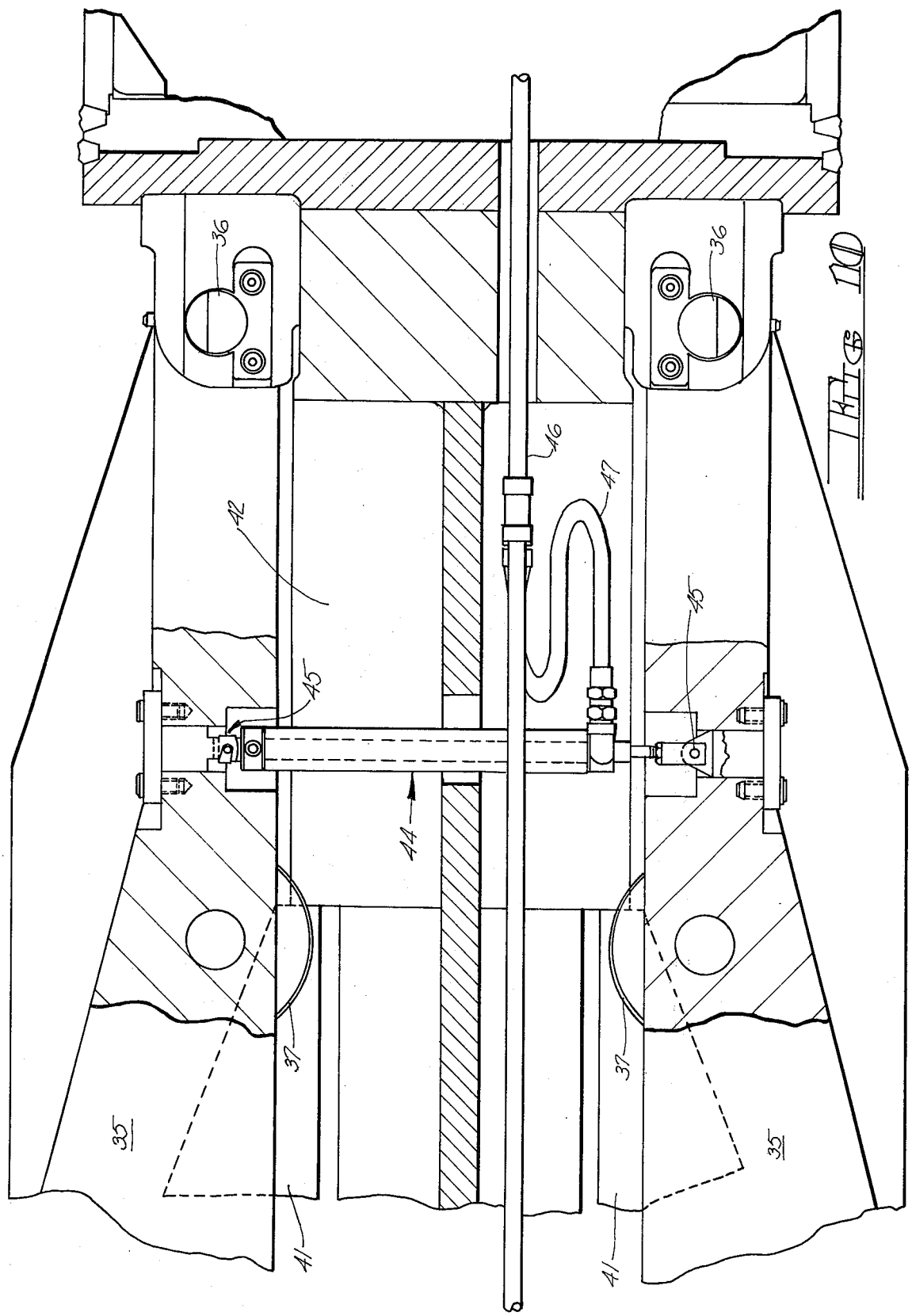

HEAVY DUTY PIPE SPREADER

BACKGROUND OF THE INVENTION

1. Field of the Invention

This invention has to do with the forming of relatively long lengths of relatively heavy gauge steel pipe. In forming such pipe, plate stock is fed into a plate bending machine which "U"'s the plate preparing it for the crimping operation. Following the U-ing operation, crimping takes place on a separate machine. Following the crimping operation, the pipe is sent onto a machine which substantially closes the crimped product, forming it into its final round shape. After being thus closed the pipe emerges from the closing press with its two edges formed rather tightly together. In such condition, however, the pipe cannot be fed into O.D. welders which require that the edges of the pipe be passed by a vertical hanger plate that supports an internal arbor approximately 1 inch thick. It is necessary, therefore, to spread apart these closed edges so as to form a permanent opening therebetween of about one and a half inches to two inches along the full length of the pipe.

2. Description of the Prior Art

A search of the United States patent art was conducted in an effort to locate that art most pertinent to the wedge pipe spreader disclosed herein. No assertion is made, however, that the most pertinent art was indeed located, although, as indicated, that was the intent of the search. This search developed the following references:

| | |
|---|---|
| 1,994,111 | Rocchi |
| 2,007,996 | Baker |
| 2,219,049 | McArthur |
| 2,613,303 | Babbitt |
| 2,845,989 | Ewaldson, et al. |
| 2,857,871 | Reynolds |
| 3,075,484 | Benteler |
| 3,191,843 | Tomkins |
| 3,198,931 | Klempay |
| 3,236,083 | Minderoth, Jr. et al. |
| 3,285,490 | Roper |
| 3,329,329 | Karmann |
| 3,362,603 | Bauer |
| 3,365,144 | Daub |
| 3,397,564 | Schroeder |
| 3,431,383 | Ullery, Jr., et al. |
| 3,452,424 | Morris |
| 3,462,059 | Bauer, et al. |
| 3,633,813 | Looney |
| 3,647,131 | Hayne |
| 3,662,940 | Stettler |
| 3,684,149 | Ambler |
| 3,765,665 | Work |
| 3,770,927 | Christopher |

In the only known machine of the type to spread or open 40 feet long steel pipe of 0.250 to 0.750 wall thickness, spreader units employing complicated linkage arrangements are utilized. A plurality of cylinders is needed to actuate such linkage arrangement. Although none of the art appears to disclose a heavy duty pipe spreader as described herein, perhaps the following patents from those listed above are the more relevant: 3,662,940; 3,285,490; 2,857,871; 2,845,989; 2,007,996 and 3,647,131.

SUMMARY OF THE INVENTION

The heavy duty pipe spreader of this invention comprises an elongated, substantially horizontally disposed boom pivotally connected to a base support. The boom is disposed above a series of five roller units, the first of which units comprises a drive roller unit by which the other four roller units are also driven. When disposed over these roller units, the boom is supported by four jack support assemblies which are arranged to retract as the pipe is moved on to the roller units. The support rollers of the roller units are arranged in a fixed position so as to move pipe on and off the boom.

Five spreader assemblies are employed. Each spreader assembly is comprised of two arms pivotally connected to the boom at one end and each having a pipe engaging roller pivotally connected to the other end. A wedge having identical tapers on both sides is provided for each spreader assembly. Such wedge units are fastened to a common pull rod. The single pull rod is actuated by a power cylinder assembled in line. Means are also provided to contract the spreader arms when the wedge units are removed therefrom. Means are provided at the forward end of the boom to aid in getting the pipe onto the boom arrangement.

All five spreader assemblies are actuated by the single pull rod via the power cylinder. All spreader arms will expand and contract simultaneously with equal travel at both sides of the machine center line.

BRIEF DESCRIPTION OF THE DRAWINGS

FIG. 1 is a side elevation of the entire wedge pipe spreader machine.

FIG. 2 is a plan view of the entire wedge pipe spreader machine.

FIG. 3 is an enlarged fragmentary view of one of the five spreader assemblies in its closed condition.

FIG. 4 is a plan view of one of the five spreader assemblies in its open condition.

FIG. 5 is a fragmentary side elevation of one of the spreader assemblies corresponding generally to that shown in FIG. 3.

FIG. 6 is an enlarged plan view, partly in section, of one of the spreader arms utilized in the machine.

FIG. 7 is a side elevation, partly in section, of the arm shown in FIGS. 5 and 6.

FIG. 8 is a fragmentary plan view of a portion of the drive mechanism provided for the jack support assemblies or boom elevators.

FIG. 9 is an enlarged side elevation of one of the four jack support assemblies or boom elevators generally indicated in FIG. 1.

FIG. 10 is an enlarged fragmentary plan view, partly in section, showing a closure mechanism for the spreader arms.

DESCRIPTION OF THE PREFERRED EMBODIMENTS

Referring now to FIGS. 1 and 2, the boom housing is generally indicated at 20 and has a vertically adjustable, universal pivotal connection 21, 21a to a base support 22. The boom housing is supported throughout its length by a plurality of jack support assemblies, four of such assemblies generally indicated at 23 being shown. Each of these jack support assemblies, or boom elevators, includes a topmost roller 24 on which the housing 20 rests. Actuation of the assemblies 23 may be controlled by a motor 25 operating through conventional shafts 26 (see also FIGS. 8 and 9) and a three-way power take-off 27 connected to the individual jack supports assemblies 28 and air cylinders 51 supported on the arms 50. (This arrangement will be discussed further in an elaboration of the depictions of FIGS. 8 and 9.) A pivoted centering device 29 is located at the extreme front of the machine housing 20 and this device may aid in centering the pipe with respect to the machine and it may assist in stabilization during spreading.

The boom housing 20 supported on the rollers 24 is disposed above a series of roller units 30, 5 such roller units being depicted, the first of these being driven as indicated at 31, there being means, not shown, by which the other four roller units are chain driven via this unit 31. Conventional mechanism not shown in detail but generally indicated at 32 is provided for electrical operation and control of each of the roller units 30 so as to make it possible to move the actual support rollers 33 simultaneously laterally with respect to the boom housing 20. Pipe to be worked on by the pipe spreader depicted herein is moved onto the rollers 33 of the units 30. As the pipe moves towards the base support 22 the rollers 24 of the jack support assemblies 23 will retract as will be discussed in greater detail in connection with the description of FIG. 9.

Attached to the boom structure 20 are a plurality of arm support sections or spreader assemblies generally indicated at 34, five such sections being illustrated. Each of these five sections is comprised of a pair of pivoted arms 35, see FIGS. 3 and 4 wherein the sections are depicted in greater detail. The arms 35 are pivotally connected to the boom housing 20 as indicated at 36. Each of these arms is provided with a wedge roller 37 rotatably mounted near the center thereof. A bracket member 38 is pivotally connected to the end of each arm as indicated at 39, the bracket rotatably supporting a pipe engaging roller 40. A cushion 38a is provided between the pivoted bracket 38 and the arm 35, see also FIG. 6.

Still referring to FIGS. 3 and 4, each set of pivoted arms 35 is operated by a wedge device 41 attached to a pull rod 42. The pull rod 42 extends throughout the boom housing 20 about which the pipe to be acted upon will be telescoped. This pull rod 42 is actuated by a cylinder assembly generally indicated at 43 by conventional hydraulic means as is well known in the art, see also FIG. 1. Further details of the spreader arm arrangement are shown in FIGS. 5, 6 and 7.

From these FIGS. 1 through 7, it will be apparent that all five spreader assemblies generally indicated at 34 and including the pairs of arms 35 pivoted to the boom housing 20 are actuated by the single pull rod 42 operatively connected with the power cylinder 43 assembled in line, the pull rod being axially movable with respect to the boom housing 20. Each spreader assembly 34 comprises the two arms 35 and one of the wedge units 41 fastened to the pull rod 42. Each wedge 41 has identical tapers 41a on both sides, each taper being adapted to engage the wedge rollers 37 carried by the arms 35. All the spreader arms 35 will be expanded simultaneously by actuation of the pull rod 42 with equal travel at both sides of the machine center line.

An arrangement is illustrated in FIG. 10 by means of which all of the arms 35 are contracted simultaneously when it is desired to remove the pipe after the spreading action has been achieved. This arrangement comprises a suitable piston-air-cylinder generally indicated at 44 and illustrated as connected to the respective arms 35 as at 45. Suitable air lines 46 and 47 insure that all five of the piston-cylinder arrangements 44 are indeed actuated simultaneously.

As best seen in FIG. 5, a cam operated, boom support means is also utilized. This comprises arms 60 pivotally connected to the boom 20 as generally indicated at 61.

Two rollers 62 and 63 are mounted on each arm 60. Rollers 62 will engage the inner wall of the pipe 70 which is telescoped about the boom 20 and supported on the pipe support rollers 33, the boom support rollers 24 having been retracted. Rollers 63 normally engages cams 64 fixed on the pull rod 42. During the first spreading movement of the pull rod 42 the cams 64 thereon will clear the rollers 63. The effect of this will be to let the total boom assembly drop so that rest pads 65 fixed to the exterior of the boom housing will engage the inner wall of pipe 70 to stabilize the boom-pull rod structure during the spreading function, the bulk of the weight of the boom assembly being thus taken off the rollers 62. On the return stroke of the pull rod 42 (retraction of the spreader arms 35), the last arm retract movement will disengage the rest pads 65 from the pipe so that the boom assembly is again supported on the rollers 62 whereby the spread pipe may be readily unloaded.

The various jack support assemblies 23, 24 for maintaining the boom 20 in position above the support roller units 30 prior to the time that the pipe to be acted upon is telescoped onto the boom are illustrated in some detail in FIG. 9. A jack support assembly 23 is provided with a roller support arm 48 on which the roller 24 is mounted. The jack mechanism 28, as actuated by the motor 25 via the elements 26 and 27, is operatively connected to the pivoted arm 50 which supports an hydraulic cylinder 51. A rod 52 extending from the hydraulic cylinder 51 is connected to the arm 48. The roller support arm 48 and the cylinder support arm 50 are pivotally connected to the jack support frame 53. By this general arrangement, which will be understood by those skilled in the art, the roller 24 at each jack support station or boom elevator 23 may retract as the pipe is telescoped onto the boom. The arrangement also permits the boom to be adjusted up and down, via the motor 25 and associated mechanism, as desired, for basic pipe size boom setting.

By way of summary, it will be observed that the heavy duty pipe spreader utilizes five sets of pivoted, wedge actuated spreader arms 35. A single hydraulic cylinder 43 acting in line with the pull rod 42 insures simultaneous actuation of the spreader arms. The pivoted roller 40 mounted on the end of each of the spreader arms 35 eliminates excessive friction and marking during the spreading action. The wedges 41 fixed in the pull rod 42 act on the rollers 37 carried by the arms 35 to insure that the rollers 40 are indeed simultaneously spread even amounts. The arrangement 44–47 insures that these arms 35 are also retracted simultaneously when that time comes.

It will be apparent to those skilled in the art that modifications may be made in this heavy duty pipe spreader without departing from the scope and spirit of the invention. And while the invention has been depicted in terms of particular structures and arrangements, the invention is not be limited to those structures and arrangements, except insofar as they are specifically set forth in the subjoined claims.

The embodiments of the invention in which an exclusive property or privilege is claimed are defined as follows:

1. A heavy duty pipe spreader comprising: a base support; a boom pivotally connected to said base support; a plurality of like sets of spreader means connected to said boom and spaced there along, each of said sets comprised of a pair of pivoted spreader arms having pipe engaging means thereon; a pull rod disposed on said boom; means to reciprocate said pull rod along its axis relative to said boom; and like wedge means spaced along said pull rod for each set of spreader means, each said wedge means engaging a pair of said spreader arms, said wedge means being fastened to said pull rod; whereby when said pull rod is actuated to draw said wedge means towards said spreader arms said pipe engaging means are simultaneously brought into contact with the interior wall of a pipe telescoped onto said boom so as to effect the desired spreading of said pipe along its full length.

2. The spreader of claim 1 in which each said pipe engaging means comprises a roller pivoted on each said pivoted arm whereby to eliminate excessive friction and marking when spreading.

3. The spreader arm of claim 1 including a wedge roller fastened to each of said pivoted arms so as to be engaged by a said wedge when the pull rod pulls said wedges towards said pivoted arms.

4. The spreader of claim 1 including actuating means for simultaneously retracting said pivoted arms out of engagement with the pipe when spreading thereof is completed.

5. The spreader of claim 1 including support rollers for said boom, and means to retract said support rollers when pipe is telescoped onto said boom.

6. The spreader of claim 1 including pipe rollers positioned beneath said boom and by which pipe telescoped on to said boom for spreading is supported during the spreading operation achieved by pulling said wedge means into engagement with said spreader arms.

7. The spreader of claim 1 including a support arm pivotally connected to said boom, a feed roller mounted on said support arm so as to engage the interior wall of said pipe, cam means on said pull rod, a second roller mounted on said support arm and normally engaging said cam means, and rest pads fixed to said boom and normally spaced from the interior wall of said pipe by virtue of the engagement of said cam means by said second roller, whereby when said pull rod is actuated said cam means will clear said second roller and said rest pads will engage the interior wall of said pipe so as to stabilize said pipe and boom while spreading of said pipe continues and while said feed roller is clear thereof.

8. A wedge pipe spreader comprising: a base support; a boom pivotally connected to said base support; a single pull rod on said boom; power means in line with and connected to said pull rod to effect reciprocation of said pull rod along its axis and relative to said boom; a plurality of like spreader assemblies spaced along said boom and pull rod, each spreader assembly comprising a pair of spreader arms pivotally connected to said boom and a wedge unit fastened to said pull rod; whereby when pipe is telescoped onto said boom, actuation of said pull rod by said power means will cause each said wedge unit simultaneously to spread a pair of said spreader arms into contact with said pipe so as to spread same.

9. The spreader of claim 8 including a pipe engaging roller pivotally connected to each of said spreader arms.

10. The spreader of claim 9 in which there are five of said spreader assemblies, and five of said wedge units, each said wedge unit having a pair of identical tapers at the sides thereof, and a wedge roller on each said spreader arm, a said taper simultaneously engaging a said wedge roller so that all of said spreader arms may be expanded with equal travel to both sides of the spreader center line.

11. The spreader of claim 8 including a plurality of first adjustable supports disposed along said boom for supporting said boom in desired position; a plurality of second supports on which pipe telescoped onto said boom rests; and means to retract said first supports when pipe is telescoped onto said boom.

12. The spreader of claim 11 including alignment means on said boom to aid in centering pipe about said boom.

13. The spreader of claim 11 including means for driving all of said second supports to aid in telescoping pipe onto said boom.

14. The spreader of claim 8 including a support arm pivotally connected to said boom, a feed roller mounted on said support arm so as to engage the interior wall of said pipe, cam means on said pull rod, a second roller mounted on said support arm and normally engaging said cam means, and rest pads fixed to said boom and normally spaced from the interior wall of said pipe by virtue of the engagement of said cam means by said second roller, whereby when said pull rod is actuated said cam means will clear said second roller and said rest pads will engage the interior of said pipe so as to stabilize said pipe and boom while spreading of said pipe continues and said feed roller is clear thereof.

* * * * *